United States Patent Office
3,506,633
Patented Apr. 14, 1970

3,506,633
CATALYSTS IN OLEFIN POLYMERIZATION
Ryo Matsuura, Shigeo Kamimura, Koichiro Iwasaki, Kazuo Yamaguchi, Jihei Inomata, and Genjiro Kakogawa, Tokyo, Japan, assignors to Mitsubishi Chemical Industries Limited, Tokyo, Japan, a corporation of Japan
No Drawing. Filed Mar. 8, 1966, Ser. No. 532,589
Int. Cl. C08f 1/56, 3/06
U.S. Cl. 260—88.2   21 Claims

ABSTRACT OF THE DISCLOSURE

A polymerization catalyst having a Cl/Ti ratio of 2.5 to 3.5 is prepared by reacting a substantially amorphous alumina with titanium tetrachloride at a temperature of from 50–600° C. The alumina has a specific surface area not less than 100 m.$^2$/g. and a total pore volume less than 0.7 ml./g. The reaction product can be further reacted with a chlorinating agent to enhance its catalytic properties

---

This invention relates to improved catalysts for use in the polymerization of α-olefins.

This invention further relates to a method of manufacturing polymers and co-polymers of α-olefins. More particularly it relates to an improved method for the catalytic polymerization of ethylene and for the catalytic co-polymerization of ethylene with α-olefins other than ethylene. Both of said methods being carried out at relatively low temperature and under relatively low pressure and in the presence of the improved catalysts of the present invention.

In the method of the prior art α-olefin, for example ethylene, is polymerized with the aid of catalysts that are produced by heating a mixture or alumina and a halide of a transition metal of Group IV, V or VI of the Periodic Table. Active α-alumina is preferably employed in said prior art method. The active α-alumina reacts with titanium tetrachloride—(a halide of transition metal), producing reaction products having a composition such that the ratio of the number of chlorine atoms to titanium atoms is usually less than 2.5. This ratio will hereinafter be termed the Cl/Ti ratio. Example 1 of British Patent No. 823,024, discloses the use of a reaction product of alumina and titanium tetrachloride, said reaction product having a Cl/Ti ratio of 1.47, as a catalyst for the polymerization of ethylene. If the polymerization of ethylene is carried out with a catalyst having such a relatively low Cl/Ti ratio and in the presence of a co-catalyst such as sodium hydride, the resulting polymer has a molecular weight usually exceeding the range of $10^5$ to $1.5 \times 10^5$. The flow properties of the resultant polymer are therefore too poor to permit its practical use in for example molding. Hence, in order to obtain polymers having a molecular weight of from $5 \times 10^4$ to $10^5$, which range is suitable for molding, various measures must be taken to regulate the molecular weight. However, complicated processes are required in order to implement these regulatory measures. Their complexity makes them industrially disadvantageous.

We have found that when a catalyst having a Cl/Ti ratio of from 2.5 to 3.5, said catalyst being a reaction product of an alumina having specific surface structures and titanium tetrachloride, is employed together with a suitable co-catalyst to polymerize an α-olefin such as ethylene or a mixture of ethylene and α-olefins other than ethylene under suitably selected reaction conditions, the resulting polymers will have an average molecular weight within the range of $3 \times 10^4$ to $10^5$.

The first object of the present invention is to provide a method for manufacturing polyethylene and co-polymers of ethylene with α-olefins other than ethylene which are highly suitable for the production of moldings for example blow moldings such as bottles, injection moldings such as crates and containers, and extrusion moldings such as films, sheets and filaments. In other words, the first object of the invention is to provide a method for manufacturing polyethylene and co-polymers of ethylene with α-olefins other than ethylene, having a molecular weight, molecular weight distribution, and crystallinity which permits their use for the aforesaid purposes.

The second object of the invention is to provide polymerization catalysts especially fit for the manufacturing of polyolefins, such as polyethylene and co-polymers of ethylene with α-olefins other than ethylene, which are useful for accomplishing the above-mentioned objects.

The first object is accomplished by polymerizing α-olefins selected from among ethylene and mixtures of ethylene and α-olefins other than ethylene in an inert hydrocarbon solvent, in the presence of (a) a catalyst having a Cl/Ti ratio of 2.5 to 3.5, said catalyst being a reaction product of a substantially amorphous alumina having a specific surface area not less than 100 m.$^2$/g. and a total pore volume less than 0.7 ml./g. and titanium tetrachloride or a further reaction product of said reaction product with a chlorinating agent, and (b) a co-catalyst selected from among metals of Groups I, II and II of the Periodic Table, hydrides and complex hydrides of said metals.

The second object of the invention is accomplished by reacting particles of a substantially amorphous alumina having the above-mentioned specific surface properties with gaseous titanium tetrachloride, which is either neat or diluted with an inert gas, at an elevated temperature, in a specific range, and in a fluidized state, or by further causing the reaction product thus obtained to come in contact with a chlorinating agent.

Other objects of the invention and the mode in which said objects are attained will be apparent from the following description.

A substantially amorphous alumina is employed as the raw material for manufacturing the catalyst of the present invention. Said alumina is obtained by calcining a substantially amorphous alumina hydrate at a temperature of from 300° C. to 700° C. The X-ray diffraction pattern of the alumina so obtained reveals that it is an amorphorus or nearly amorphous alumina (so-called ρ-alumina) having a specific surface area less than 100 m.$^2$/g. and a total pore volume less than 0.7 ml./g.

As used in this specification the terminology "a specific surface area" means the surface area calculated from low temperature nitrogen absorption measurement by the BET equation. Further the terminology "a total pore volume" means the weight of carbon tetrachloride adsorbed by a sample after equilibration, as measured by the method described in Analytical Chemistry, vol. 27, p. 1963 (1955).

The catalyst employed in accordance with the present invention is obtained either by reacting the aforesaid type of alumina with titanium tetrachloride or by chlorinating the thus obtained reaction product. The catalyst contains titanium of four valency, chlorine and oxygen and has a Cl/Ti ratio of 2.5 to 3.5.

Table 1 compares the catalyst of the present invention with other catalysts, which may be obtained by reacting amorphous alumina, having a total pore volume not less than 0.7 ml./g., or γ-alumina with titanium tetrachloride, in respect of the catalytic function exercised in the polymerization of ethylene and in the presence of a suitable co-catalyst to give a polyethylene which by virtue of its molecular weight is suitable for use in molding.

TABLE 1

| Alumina for raw material | | Catalyst | |
|---|---|---|---|
| Sort of Alumina | Total pore volume (ml./g.) | Cl/Ti ratio | Flow property of obtained polymer |
| 1... α-Alumina | 0.28 | 2.2 | Bad. |
| 2........do | 0.28 | 2.0 | Bad. |
| 3... Amorphous alumina [1] | 0.36 | 2.9 | Good. |
| 4........do[1] | 1.20 | 2.8 | Bad. |
| 5... ρ-Alumina [2] | 0.49 | 2.6 | Good. |

[1] Amorphous alumina prepared by hydrolyzing alumina isopropylate and calcining the hydrolysis product.
[2] ρ-Alumina prepared by calcining a substantially amorphous alumina-hydrate commercially available under the brand name "Neobead C-MS" from the Mizusawa Kagaku Co.

The method of the invention will now be described in detail. The preparation of a substantially amorphous alumina: Amongst the various methods of preparation, two methods will be described as follows:

(1) The first method comprises converting aluminum alcoholate to amorphous alumina hydrate by hydrolysis followed by calcination to obtain a truly amorphous alumina as determined by the analysis of its X-ray diffraction pattern.

Although one needs to employ aluminum alcoholates as the raw material for hydrolysis, no specific limitation is imposed on the type of aluminum alcoholates used. Alcoholates of low aliphatic alcohols such as aluminum methylate, aluminum ethylate, aluminum n-propylate, aluminum isopropylate, aluminum n-butylate and aluminum iso-butylate are preferred as these alcoholates offer convenience of operation. However, if required other alcoholates of high alcohols may be employed.

The properties of the amorphous alumina and the polymerization catalysts which is prepared from such alumina vary and depend upon the conditions under which the aluminum alcohols are hydrolyzed. Therefore, careful attention is invited to the selection of said conditions. The hydrolysis temperature is one of the most important of said conditions. The hydrolysis temperature should usually be below 50° C., preferably in the range of −10° C. to 10° C. The crystallinity and total pore volume of the calcined alumina increases with an increase in the hydrolysis temperature. Although the result is affected more or less by other conditions, as a rule, it is impossible to obtain the desired amorphous alumina when the hydrolysis is carried out at temperature higher than 50° C. If no hydrophobic medium, which will be referred to in the latter part this specification, is used, hydrolysis temperatures not exceeding 20° C. are preferred. Another important condition is the nature of the hydrolysis agent or pH thereof. Usually acids can serve as the hydrolysis agent. Moreover, in some instances water may be employed as the hydrolysis agent. It is by no means appropriate to use alkaline substances in any case. Most desirably, an aqueous solution of an inorganic acid such as hydrochloric acid, sulfuric acid and nitric acid or organic acids such as acetic acid and formic acid which have a dissociation constant exceeding $10^{-7}$ are employed. Their pH is adjusted to a pH below 5, preferably 1 to 3, prior to their use. Although a lower pH generally gives a better result, too low a pH adversely affects the separation operation that is carried out after the hydrolysis. Further, the selection of a suitable medium for hydrolysis makes it possible to render water serviceable as the hydrolysis agent. Such mediums for hydrolysis include a hydrophobic medium which is inert to the reaction for example hexane, heptane, cyclopentane, cyclohexane, toluene, xylene, petroleum ether, ligroin, chloroform, carbon tetrachloride, and ether. Other media such as alcohol may also be used to remove or regulate reaction heat generated during the course of the hydrolysis, however in this case water cannot be employed as the hydrolysis agent.

If proper conditions, as mentioned above, are selected the hydrolysis can be carried out merely by contacting aluminum alcoholate with a hydrolysis agent and without any specific limitations being imposed on the mode of hydrolysis. Naturally, stirring is favored as it effects a uniform, adequate contact. Aging, if required, may also be relied on. Upon completion of hydrolysis, the resultant solid alumina hydrate is collected, washed with water and dried. The alumina hydrate thus obtained is essentially amorphous. It is hardly crystallized even after standing for a considerable length of time or being heated to a considerably high temperature. The alumina hydrate is then calcined. The calcination is carried out in an atmosphere of inert gas such as dry nitrogen and at a temperature of 300° C. to 700° C., preferably 500° C. to 600° C. The temperature selected depends upon the hydrolysis conditions.

When the hydrolysis conditions and the calcination conditions as mentioned above are carefully selected the desired alumina is obtained. The desired alumina is substantially amorphous. Further, it has a large specific surface area and a small total pore volume. It is of course possible to have the specific surface area and total pore volume varied extensively in response to the properties of a polymerization catalyst to be prepared. However, in order to prepare a polymerization catalyst having properties advantageous from an industrial viewpoint, that is to say, in order to produce a polymer having a molecular weight which renders the polymer fit for practical use, the raw material alumina should have a specific surface area which is not less than 100 m.$^2$/g., preferably not less than 250 m.$^2$/g. and a total pore volume which is less than about 0.7 ml./g., preferably less than about 0.5 ml./g. The total pore volume of the alumina is closely related to the molecular weight of the polymer that is produced with a catalyst prepared from the alumina. The following Table 2 illustrates this correlationship by using as an example, the polymerization of ethylene.

TABLE 2

| | Total pore volume of alumina (ml./g.) | Average molecular weight of polyethylene |
|---|---|---|
| 1 | 0.36 | $5.2 \times 10^4$ |
| 2 | 0.41 | $6.2 \times 10^4$ |
| 3 | 0.43 | $9.0 \times 10^4$ |

(2) The second method is the method disclosed in British Patent No. 980,893. This method is as follows:

An aqueous colloidal solution of basic aluminum sulfate having the composition $Al_2O_3 \cdot (1.6-0.8)SO_3$ is passed through a water-immiscible inert organic liquid at a temperature of from 40° C. to 100° C. so as to convert the said solution into spherical hydrogels. The hydrogels are washed in water before syneresis occurs in order to remove sulfate ions or aluminum sulfate. This reduces the mol ratio of $SO_3$ to $Al_2O_3$ to 0.4 to 0.7. The remainder of the sulfate ions in the hydrogels is then washed away as soluble sulfate thereby slowly raising the pH. The rate in increase in pH value should be slow enough to avoid the formation of cracks in the hydrogels. The spherical hydrogels are dried.

The alumina hydrate manufactured by this method is commercially available. For example, it is available under the brand name "Neobead C–MS" from the Mizusawa Kagaku Co., Japan.

The substantially amorphous alumina which is obtained is then calcined in the atmosphere of an inert gas, such as nitrogen and air at a temperature of from 300° C. to 700° C. A substantially amorphous alumina, (so-called ρ-alumina) which shows a broad peak in its X-ray diffraction pattern at only the 1.41 A. position is thereby obtained.

Preparation of the catalyst:

In order to prepare an effective polymerization catalyst for use in the method of the present invention, it is necessary to react the alumina which has been obtained as mentioned above with titanium tetrachloride. Unless accompanied by said reaction, mere dipping or mixing does not result in the production of an effective polymerization catalyst. Additionally, since the reaction conditions under which said alumina reacts wtih titanium tetrachloride considerably affect the properties of the polymerization catalyst that is obtained, it is desirable to select the reaction conditions from the following defined reaction conditions. For example, the reaction temperature, is selected from the range 50–600° C., preferably from the range 300–600° C. The selection of the reaction temperature is of utmost importance since the activity of the polymerization catalyst and the molecular weight of the polymer that is produced when said catalyst is employed vary dependently on the reaction temperature. The method employed for effecting the reaction should be one which preferably establishes contact at an elevated temperature between the alumina and the titanium tetrachloride inert gas dilution. Naturally, it is also possible to carry out the reaction by an alternate reaction process. For example, the predestined alumina may be moistened with an application of titanium tetrachloride and then contacted with an inert gas at an elevated temperature. However, the reaction products thus obtained are not immediately serviceable as the desired catalyst in the manufacture of a polyethylene having a molecular weight in the practical range. Further they are generally poor in reproductivity.

The most preferred method for effecting the reaction comprises introducing an inert gas saturated with titanium tetrachloride at a suitable temperature into a bed filled with particles of alumina to establish contact between them for reaction. Said bed being maintained in an appropriate fluidized state, preferably in the so-called "state of fluidized bed." The preferred particle size of the alumina employed for effecting the reaction is in the range of 10 to 150 microns.

Inert gases which may be employed include nitrogen and air. If air is used it must be absolutely dry. As a rule, the saturation of inert gas with titanium tetrachloride is effected by introducing an inert gas into a saturator filled with titanium tetrachloride. The saturator may be placed at a relatively low temperature so that a suitable vapor pressure is indicated by titanium tetrachloride. This eliminates the need for preheating the titanium tetrachloride to a temperature above its boiling point to keep it in the gaseous state. Such temperature is usually selected from the range of 10 to 100° C., preferably from the range of 30 to 80° C. With this method of effecting the reaction, the flow rate of the inert gas diluted gaseous titanium tetrachloride effects, irrespective of its quantity, the properties of the catalyst. In other words, the same quantity of said titanium tetrachloride will not necessarily give a catalyst having the same properties. In particular, the molecular weight of the polymer obtained with the use of such catalyst is considerably affected by the flow rate. The flow rate is usually 10–1,000 cm./min., preferably 20–700 cm./min. in terms of linear velocity. The quantity of titanium tetrachloride employed in the reaction exceeds about 0.01 ml. per gram of alumina, however, the amount used can be varied over a wide range. Although no substantial change results in the properties of the catalyst produced when a greater amount of titanium tetrachloride is employed, the use of more than 1 ml. of titanium tetrachloride per gram of alumina offers no advantage.

The alumina and titanium tetrachloride reaction product is preferably calcined in an inert gas stream at a temperature of 100° C. to 600° C. Specifically, when the reaction temperature of the alumina with the titanium tetrachloride is below 300° C., a temperature over 300° C. is preferred for the calcination.

The chemical constitution of the alumina and titanium tetrachloride reaction product thus obtained is not as yet clear. However, in view of several facts it is believed that said product is not a mere mixture of adsorbent, but a chemical compound of alumina and titanium tetrachloride. For example, if the catalyst were a mere mixture, substantially the entire amount of titanium tetrachloride should be eluted by methanol treatment. In actual operation, however, only a small amount of elution occurs with the methanol treatment. Further, if said product were an adsorbent comprised of titanium tetrachloride and alumina taken up by the former at the surface thereof, then absorbed titanium tetrachloride would be released from the alumina by a nitrogen gas flash at a temperature over the boiling point of titanium tetrachloride, thereby resulting in a decrease in the amount of titanium and chloride. In actual operation, however, no change occurred in the amount of titanium and chlorine or in the catalyst properties in spite of the nitrogen treatment.

The polymerization catalyst thus obtained possesses adequate catalytic properties. These properties may however be enhanced by reaction with a chlorinating agent. The said reaction is carried out by contacting the aforesaid alumina-titanium tetrachloride reaction product with a chlorinating agent such as chloroform, carbon tetrachloride, chlorine, hydrogen chloride, thionyl chloride, silicon tetrachloride and nitrosyl chloride. The chlorinating agent may be in gaseous form either neat or admixed with an inert gas such as dry nitrogen and air. The chlorination reaction takes place at a temperature in the range of 100 to 600° C., preferably 200 to 500° C. and over a period of 10 minutes to 2 hours or less than 10 minutes, as the case may be. The chlorination product contains positively more chlorine than before the reaction. Although the chemical constitution of the resultant catalyst is unknown and the corelationship between its chlorine content and its catalytic properties is not sufficiently known, nevertheless this treatment increases the polymerization velocity and decreases the molecular weight of the polymer.

Polymerization:

The polymerization of ethylene or co-polymerization of ethylene with an α-olefin other than ethylene is carried out according to the invention in an inert hydrocarbon solvent usually in the presence of a co-catalyst, and in the presence of a catalyst having a Cl/Ti ratio of from 2.5 to 3.5, which catalyst is a reaction product of alumina and titanium tetrachloride or a further reaction product of said reaction product with a chlorinating agent.

The inert hydrocarbon solvents include for example aliphatic saturated hydrocarbons such as n-hexane and n-heptane, aromatic hydrocarbons such as toluene and xylene, and alicyclic hydrocarbons such as cyclohexane and Decalin.

The quantity of catalyst employed in the polymerization is almost decisive of the quantity of polymer produced. The amount of catalyst used is generally 0.1–100 g., preferably 0.5–10.0 g. per liter of solvent employed in the polymerization.

Co-catalysts include metals of the Groups I, II and III, hydrides and complex hydrides thereof such as sodium, potassium, lithium, magnesium, calcium, aluminum, sodium hydride, potassium hydride, lithium hydride, magnesium hydride, calcium hydride, lithium aluminum hydride, and sodium aluminum hydride. The co-catalyst is dispersed in the polymerization solvent. The preferred particle size of the co-catalyst is 10 to 200 microns. The molecule weight of the resulting polymer depends upon the amount of co-catalyst used. The amount of co-catalyst employed usually ranges from about 0.01 to 10 times the weight of the polymerization catalyst. For example, 0.02–1 time for sodium, 0.1–10 times for calcium hydride, and 0.01–10 times for lithium aluminum hydride. It is possible to carry out the polymerization reaction outside said range. However, if an insufficient amount of co-catalyst is employed the induction period is lengthened, the progress of the reaction is retarded and colored polymer may result. Excess co-catalyst is liable to be washed. Therefore the use of an excess amount of co-catalyst affords no remarkable effect.

The polymerization may be carried out at a relatively low temperature and under low pressure. The temperature is usually below 350° C., and is preferably 100° C. to 300° C. The total pressure is usually about 5 to 200 kg./cm.$^2$ and is preferably 10 to 100 kg./cm.$^2$. Since the reaction temperature, the reaction pressure, and especially the partial pressure of ethylene all effect the molecular weight of the resulting polymer, suitable selections among said ranges are required in order to attain a specific purpose.

In the method according to the invention, it is possible to regulate the molecular weight of the polymer produced by having hydrogen present during the course of the polymerization. When hydrogen is employed, the necessary partial pressure of the hydrogen varies depending upon the properties of the catalyst and the polymerization temperature. The necessary partial pressure of hydrogen is usually about $1/100$ to $1/2$ the partial pressure of ethylene, practically below about 10 kg./cm.$^2$. Although one must consider the possibility of ethylene hydrogenation when hydrogen is employed to regulate the molecular weight of the polymer produced, the molecular weight of the polymer may nevertheless be effectively regulated without being adversely affected.

After the polymerization is carried out according to the method of the invention, unreacted ethylene gas, catalyst and the like are separated from the polymerization products. The polymer solution is then cooled to obtain the polymer in the solid state. This is followed by an after-treatment such as drying whereby the final product is obtained.

In addition to the polymerization of ethylene alone, the co-polymerization of ethylene and α-olefin other than ethylene can be carried out with the method of the present invention. Representative α-olefins other than ethylene are exemplified by propylene and butene-1. The amount of said α-olefins other than ethylene employed for co-polymerization with ethylene is desirably regulated so that the proportion of the ethylene to be converted to a polymer to the portion of the ethylene and said α-olefins to be converted to the polymer is usually more than 95 mol percent.

According to the method of the invention the polymerization proceeds at a high velocity and produces polymer having a molecular weight usually of from $3 \times 1^4$ to $10^5$. Such polymer is suitable for the production of moldings. Still further, in accordance with the method of invention, it is possible to vary the molecular weight of the polymers which are produced by regulating the polymerization reaction temperature, partial pressure of ethylene or the ratio of co-catalyst to catalyst. Furthermore the molecular weight distribution of a polymer obtained in accordance with the method of the invention is suitable for the production of moldings. It is possible to produce polymers having a relatively wide molecular weight distribution. These polymers are advantageously employed in the production of blow moldings, which require materials having excellent flow.

The present invention will now be illustrated with reference to the following examples which describe representative methods for the manufacture of the catalysts of the present invention, the polymerization of ethylene and the co-polymerization of ethylene with α-olefins other than ethylene.

EXAMPLE 1

Preparation of the catalyst:

150 g. of aluminum isopropylate are dissolved in 1500 ml. of isopropanol. To hydrolyze isopropylate, 750 ml. of aqueous hydrochloric acid solution (pH 1.5) are added at the rate of 5 ml./min. to the resulting solution while maintaining said solution at 0° C. and while stirring said solution at 800 r.p.m. Upon completion of the addition, the reaction mixture is further stirred at 0° C. for 1.5 hours. The precipitate thus formed is filtered, washed three times by water and dried for 8 hours at 120° C. An amorphous alumina hydrate is obtained.

The alumina hydrate is divided and sieved. 2.5 g. of alumina hydrate particles of 30–100 micron size are charged into a vertical type quartz reactor which has a diameter of about 25 mm., a height of about 80 cm. The alumina hydrate particles are calcined at 500° C. for 2 hours by passing dry nitrogen through the reactor from the bottom thereof. The linear velocity of dry nitrogen at the gas inlet disposed at the lower end of the reactor is maintained at 100 cm./min. so as to cause the alumina particles to be in a fluidized state. An analysis of its X-ray diffraction pattern proves that the alumina, when calcined, is perfectly amorphous and has a specific surface area of 350 m.$^2$/g. and a total pore volume of 0.36 ml./g. The calcination does not have a substantial effect on the particle size of the alumina.

After the calcination, the reactor is maintained at 375° C. Dry nitrogen saturated with TiCl$_4$ at 45° C. is passed into the reactor, upwardly from the bottom thereof, for 2 hours. The linear velocity of said gases at the gas inlet is maintained at 100 cm./min. so as to form a fluidized state of alumina particles. The total amount of TiCl$_4$ fed into the reactor is 13.6 ml. When the reaction is complete, dry nitrogen is passed through the reactor at a linear velocity at 140 cm./min. in order to purge the reactor of unreacted TiCl$_4$.

The catalyst thus obtained contains 3.51% by weight of Ti and 7.51% by weight of Cl. The Cl/Ti is 2.88.

Polymerization:

1.0 g. of the catalyst obtained by the aforementioned method, 0.1 g. of sodium metal (suspended in 2.5 ml. of heptane) and 200 ml. of cyclohexane are fed to a 500 ml. autoclave. The autoclave is then purged of air by introducing nitrogen therein. The contents of the autoclave are then heated. Ethylene is introduced into the autoclave. Stirring of the autoclave contents is initiated when a temperature of 220° C. is reached. The reaction is carried out for 2 hours at 220° C. and under a total pressure of 29 kg./cm.$^2$ g. The hot polymer solution is filtered to remove insoluble matter. The remaining polymer solution is cooled. 20 g. of precipitated polyethylene having an average molecular weight of $5.2 \times 10^4$ are obtained.

EXAMPLE 2

400 g. of aluminum isopropylate are dissolved in 1660 ml. of CCl$_4$. 1000 ml. of water are added to this solution at the rate of 5 ml./min. at 0° C. to hydrolyze aluminum isopropylate.

The hydrolysis product thus obtained is washed, dried, divided and calcined in the same manner as described in Example 1. An amorphous alumina having a particle size of 30–100 microns, a specific surface area of 325 m.$^2$/g. and a total pore volume of 0.41 ml./g. is obtained.

The reaction of this alumina with TiCl$_4$ results in the production of a catalyst having 3.71 wt. percent Ti and a 2.82 Cl/Ti ratio.

Polymerization:

The polymerization of ethylene is carried out as described in Example 1; excepting that the catalyst obtained by the aforesaid method is employed and the reaction time is 110 minutes. 20 g. of a polyethylene having an average molecular weight of $6.2 \times 10^4$ are obtained.

EXAMPLE 3

Preparation of the catalyst:

Aluminum isopropylate is hydrolyzed under the same conditions as described in Example 2. 3000 ml. of toluene are employed as the solvent. The hydrolyzed aluminum isopropylate is then calcined. An amorphous alumina having a specific surface area of 330 m.$^2$/g., a total pore volume of 0.42 ml./g. and a particle size of 30 to 100 microns is obtained.

This alumina is reacted with TiCl$_4$ under the same conditions as described in Example 2. A catalyst having a Ti content of 3.75 wt. percent and a Cl/Ti ratio of 2.80 is obtained.

Polymerization:

The polymerization of ethylene is carried out as described in Example 1, excepting that the catalyst obtained by the above method is employed and the reaction time is 75 minutes. 20 g. of a polyethylene having an average molecular weight of $6.7 \times 10^4$ are obtained.

EXAMPLE 4

1.0 g. of the catalyst obtained by the method of Example 1, 0.1 g. of sodium metal and 200 ml. of cyclohexane are fed to a 500 ml. autoclave. The autoclave is then purged of air by introducing hydrogen therein. The introduction of hydrogen is continued at room temperature until a predetermined hydrogen pressure is reached. The contents of the autoclave are then heated. Stirring of the autoclave contents is initiated when the temperature reaches 220° C. Ethylene is introduced into the autoclave until a total pressure of 10 kg./cm.$^2$ g. is reached. The reaction time is 2 hours. The reaction temperature is 220° C. Sufficient ethylene is introduced into the autoclave during the reaction to maintain said total pressure. The results obtained are shown in Table 3.

TABLE 3

| | Pressure of H$_2$ (kg./cm.$^2$ g. at room temp.) | Velocity of polymerization (g. Pol./g. Cat./hr.) | Average molecular weight polymer |
|---|---|---|---|
| 1 | 1 | 15 | $4.2 \times 10^4$ |
| 2 | 2 | 13 | $3.3 \times 10^4$ |
| 3 | 5 | 7 | $3.0 \times 10^4$ |

EXAMPLE 5

9.5 l. of cyclohexane are fed to a 25 l. autoclave. The autoclave is then purged of air by introducing nitrogen therein. The autoclave contents are heated under stirring. When the temperature reaches 230° C., a dispersion prepared by suspending 20 g. of the catalyst of Example 1 and 6 g. sodium hydride in 0.5 l. cyclohexane is fed into the autoclave. Ethylene is then introduced into the autoclave. The reaction temperature is maintained at 230° C. The total pressure is maintained at 43 kg./cm.$^2$ g. The reaction takes place for 40 minutes. Upon completion of the polymerization reaction, unreacted ethylene is flashed off from the reaction mixture. The reaction mixture is cooled to 180° C. and decanted to remove insoluble matter. The remaining polymer solution is cooled to room temperature. The polymer precipitates in flake form. The precipitated polymer is removed and dried. 400 g. of polyethylene are thereby obtained. The polymer thus obtained has the following properties: 0.953 density (ASTM D-1248); 8.0 Melt Index (ASTM D-1238); 251 kg./cm.$^2$ tensile yield strength; 171% ultimate elongation (ASTM D-412); and 102 kg. cm./cm.$^2$ tensile impact strength (ASTM D-1822). This polymer exhibits excellent flow-properties in an injection molding test.

EXAMPLE 6

The polymerization of ethylene is carried out as described in Example 5. The polymerization time is 22 minutes. 25 g. of the catalyst of Example 1 and 7.5 g. of sodium hydride are employed. A reaction temperature of 210° C. and a total pressure of 36 kg./cm.$^2$ g. is maintained. 395 g. of polyethylene are obtained. The polymer thus obtained has the following properties: 0.950 density (ASTM D-1248); 0.13 Melt Index (ASTM D-1238); 247 kg./cm.$^2$ tensile yield strength; 277% ultimate elongation (ASTM D-412); and 351 kg. cm./cm.$^2$ tensile impact strength (ASTM D-1822). This polymer is suitable for blow molding and shows no melt fracture on the surface of an extrudate at high extrusion velocity.

EXAMPLE 7

400 ml. of cyclohexane, 1.0 g. of the catalyst of Example 1 and 0.4 g. of sodium hydride are fed to a 1 l. autoclave. The autoclave is then purged of air by introducing nitrogen therein. The autoclave contents are heated, under stirring, to a fixed temperature in about 20 minutes. Ethylene is then introduced therein. The polymerization reaction takes place at said fixed temperature while maintaining an ethylene pressure of 20 kg./cm.$^2$. The hot polymer solution thus obtained is filtered to remove insoluble matter therefrom. The remaining solution is cooled. The precipitated polymer is recovered and dried. The results obtained are shown in the following Table 4.

TABLE 4

| | Polymerization | | | Polymer | |
|---|---|---|---|---|---|
| | Temperature (° C.) | Time (min.) | Velocity (g. Pol./g. Cat./hr.) | Yield (g.) | Average molecular weight |
| 1 | 234 | 60 | 35.1 | 35.1 | $4.4 \times 10^4$ |
| 2 | 225 | 71 | 24.3 | 28.7 | $5.4 \times 10^4$ |
| 3 | 212 | 60 | 29.7 | 29.7 | $7.6 \times 10^4$ |

It is clear from the above Table 4 that the average molecular weight of the polyethylene produced is easily regulated by controlling the polymerization temperature.

EXAMPLE 8

The polymerization of ethylene is carried out as described in Example 7, employing the same amount of the same catalyst and co-catalyst described in said Example 7, and maintaining the temperature at 225° C. and the fixed partial pressure of ethylene. The results obtained are shown in the following Table 5.

TABLE 5

| | Polymerization | | | Polymer | |
|---|---|---|---|---|---|
| | Partial pressure of ethylene (kg./cm.$^2$) | Time (min.) | Velocity (g. Pol./g. Cat./hr.) | Yield (g.) | Average molecular weight |
| 1 | 10 | 156 | 12.6 | 32.8 | $5 \times 10^4$ |
| 2 | 20 | 71 | 24.3 | 28.7 | $5.4 \times 10^4$ |
| 3 | 30 | 54 | 37.1 | 33.4 | $6.7 \times 10^4$ |

It is clear from the preceding Table 5 that the average molecular weight of the polyethylene produced is easily regulated by controlling the polymerization temperature.

EXAMPLE 9

The polymerization of ethylene is carried out as described in Example 7 employing the same amount of the same catalyst and the fixed amount of the same co-catalyst as described in said Example 7 while maintaining the temperature at 225° C. and the partial pressure of ethylene at 20 kg./cm.$^2$ The results obtained are shown in the following Table 6.

TABLE 6

| | Polymerization | | | Polymer | |
|---|---|---|---|---|---|
| | NaH/catalyst ratio in weight | Time (min.) | Velocity (g. Pol./g. Cat./hr.) | Yield (g.) | Average molecular weight |
| 1 | 0.1 | 116 | 15.7 | 30.4 | $5 \times 10^4$ |
| 2 | 0.4 | 71 | 24.3 | 28.7 | $5.4 \times 10^4$ |
| 3 | 0.8 | 78 | 20.8 | 27.0 | $5.7 \times 10^4$ |

As is apparent from the above Table 6, the average molecular weight of the polyethylene produced is easily regulated by changing the ratio of the catalyst to the sodium hydride.

EXAMPLE 10

Preparation of the catalyst:

120 g. of aluminum ethylate are dissolved in 1400 ml. of ethanol. 750 ml. of aqueous hydrochloric acid solution (pH 1.7) are added thereto, under vigorous stirring, at a temperature of 0° C., and at the rate of 5 ml./min. to hydrolyze aluminum ethylate. The precipitate thus formed is washed three times with water and dried at 120° C. for 8 hours. An amorphous alumina hydrate is obtained.

The alumina hydrate thus obtained is divided and calcined as described in Example 1. An amorphous alumina having a specific surface area of 340 m.$^2$/g., a total pore volume of 0.37 and a particle size of 30 to 100 microns is thereby obtained.

The calcined alumina is reacted with TiCl$_4$ as described in Example 1. A catalyst having a Ti content of 3.5% by weight and a Cl/Ti ratio of 2.86 is obtained.

Polymerization:

The method described in Example 1 is followed to carry out the polymerization of ethylene. The catalyst obtained by the aforementioned method is employed. 20 g of polyethylene having an average molecular weight of $5.4 \times 10^4$ are obtained.

EXAMPLE 11

Preparation of catalyst:

480 g. of aluminum n-butylate dissolved in 2000 ml. of CCl$_4$ are hydrolyzed with water. The same method as described in Example 2 is employed. The hydrolysis product thus obtained is washed and dried. An amorphous alumina hydrate is obtained.

The alumina hydrate thus obtained is divided and calcined using the same method as described in Example 1. An amorphous alumina having a specific surface area of 320 m.$^2$/g., a total pore volume of 0.42 ml./g. and a particle size of 30 to 100 microns is obtained.

After calcination, the calcined alumina is reacted with TiCl$_4$, using the same method as described in Example 1. A catalyst having a Ti content of 3.69% and a Cl/Ti ratio of 2.83 is thereby obtained.

Polymerization:

The method described in Example 2 is followed to carry out the polymerization of ethylene. The catalyst obtained by the aforementioned method is employed. 20 g. of polyethylene having an average molecular weight of $6.3 \times 10^4$ are obtained.

EXAMPLE 12

Preparation of catalyst:

750 g. of aluminum isopropylate are dissolved in 7.5 l. of isopropanol. 3.75 l. aqueous hydrochloric acid solution (pH 1.2) are added thereto, while stirring at 800 r.p.m., at 0° C. and at the rate of 10 ml./min., to hydrolyze aluminum isopropylate. When the addition of the hydrochloric acid solution is completed the reaction mixture is stirred at 0° C. for 1 hour. The precipitate thus formed is filtered, washed three times with water and dried at 120° C. for 8 hours. An amorphous alumina hydrate is obtained.

The alumina hydrate is divided and sieved. 130 g. of amorphous aluminum hydrate particles of 30 to 100 micron size are charged into a vertical type reactor. The height of the reactor is about 1 m. and its diameter is about 30 mm. The amorphous alumina hydrate is then calcined at 500° C. for 2 hours with dry nitrogen which is introduced into the reactor from the bottom thereof. An analysis of its X-ray diffraction pattern shows that the calcined alumina is perfectly amorphous, and has a specific surface area of 345 m.$^2$/g., and a total pore volume of 0.34 ml./g. No substantial change was noticed in the particle size before and after the calcination.

After the calcination, the reactor is maintained at 375° C.

TiCl saturated dry nitrogen is passed through the reactor, which has been maintained at 375° C., upwardly from the bottom thereof, for 2 hours. The linear velocity at the inlet of the gas is kept at 140 cm./min. so as to form a fluidized state of alumina particles in the reactor. The total amount of TiCl$_4$ fed to the reactor measures 54 ml. Upon completion of the reaction, the reactor is purged of unreacted TiCl$_4$ by passing dry nitrogen through the reactor for 10 minutes at a linear velocity of 140 cm./min.

The catalyst thus obtained contains 3.49 wt. percent of Ti and 7.51 wt. percent of Cl. The Cl/Ti ratio of the catalyst is 3.11.

Polmerization:

1.0 g. of the catalyst obtained by the aforementioned method and sealed in a glass ampule, 0.4 g. of sodium hydride and 400 ml. of cyclohexane are fed into a 1 l. autoclave. The autoclave is then purged of air by introducing nitrogen therein. The contents of the autoclave are heated up to 225° C. and then stirred. The ampule containing said catalyst is broken and ethylene is immediately introduced into the autoclave. The polymerization is carried out for 68 minutes at 225° C. while keeping the partial pressure of ethylene at 20 kg./cm.$^2$. Upon completion of the polymerization reaction, unreacted ethylene is flashed off from the reaction mixture. The reaction mixture is cooled to 200° C. and filtered to remove insoluble matter. The remaining polymer solution is cooled to 60° C. Precipitated polyethylene is collected and dried. 32.3 g. of polyethylene having an average molecular weight of $4.5 \times 10^4$ are obtained.

EXAMPLE 13

Preparation of the catalyst:

The same method as described in Example 12 is followed to obtain an amorphous alumina hydrate excepting that an aqueous hydrochloric acid solution (pH 1.5) is used for the hydrolysis.

The alumina hydrate is divided to obtain 130 g. of particles which are calcined in the same reactor and in the same manner as described in Example 12 and then reacted with TiCl$_4$. The reactor is purged of unreacted TiCl$_4$ by passing dry nitrogen therethrough. Chlorination is then carried out for 30 minutes by passing CCl$_4$ saturated dry nitrogen through the reactor upwardly from the bottom thereof while maintaining the inside of the reactor at a temperature of 350° C. and the linear velocity of the gas at the inlet of the reactor at 140 cm./min.

The catalyst thus obtained contains 3.21% by weight of Ti and 8.20% by weight of Cl. The Cl/Ti ratio of the catalyst is 3.43.

Polymerization:

The polymerization of ethylene is carried out, as described in Example 12, for a period of 75 minutes, employing 1.0 g. of catalyst obtained by the above-mentioned method and 0.4 g. of sodium hydride. 34.8 g. of polyethylene having an average molecular weight of $3.9 \times 10^4$ are obtained.

EXAMPLE 14

Preparation of the catalyst:

130 g. of substantially amorphous alumina hydrate commercially available under the brand name "Neobead C-MS" from the Mizusawa Kagaku Co. are calcined in a current of dry air at 500° C. for 2 hours, dipped in 1 l. of 1 N-HCl for 15 minutes, washed with water until the washing solution reaches pH 5, and dried at 120° C. for 2 hours.

The ρ-alumina thus obtained has a specific surface area of 330 m.$^2$/g., a total pore volume of 0.49 ml./g. and a particle size of 30 to 90 microns. The ρ-alumina is reacted with TiCl$_4$ in the same manner as described in Example 1. A catalyst having a Cl/Ti ratio of 2.68 is obtained.

Polymerization:

The method described in Example 7 is followed to carry out the polymerization of ethylene. 1.0 g. of the catalyst obtained by the above-mentioned method and 0.4 g. of sodium hydride are employed. The fixed temperature is maintained and the partial pressure of ethylene is kept at 20 kg./cm.$^2$. The results obtained are shown in the following Table 7.

TABLE 7

| | Polymerization | | | Polymer | |
|---|---|---|---|---|---|
| | Temperature (°C.) | Time (min.) | Velocity (g. Pol./ g. Cat./ hr.) | Yield (g.) | Average molecular weight |
| 1 | 210 | 62 | 32.0 | 33.0 | $7.3 \times 10^4$ |
| 2 | 225 | 65 | 29.7 | 32.1 | $5.4 \times 10^4$ |
| 3 | 235 | 45 | 42.2 | 31.6 | $5.0 \times 10^4$ |

As is apparent from the above Table 7, the average molecular weight of the polyethylene obtained is easily regulated by controlling the polymerization temperature.

EXAMPLE 15

350 ml. of cyclohexane are fed into a 1 l. autoclave. The autoclave is then purged of air by introducing nitrogen therein. The autoclave contents are heated under stirring until a fixed temperature is attained. A fixed amount of propylene is introduced into the autoclave. The autoclave is then filled with ethylene until a total of 60 kg./cm.$^2$ g. is attained. The autoclave contents are admixed. A dispersion prepared by suspending 1.0 g. of the catalyst produced by the method of Example 14 and 0.4 g. of sodium hydride in 50 ml. of cyclohexane is then fed into the autoclave. The reaction takes place at the fixed temperature and under a total pressure of 60 kg./cm.$^2$ g. The results obtained are shown in the following Table 8.

TABLE 8

| | Co-polymerization | | | | Co-polymer | | | | |
|---|---|---|---|---|---|---|---|---|---|
| | Amount of Propylene fed (g.) | Temperature (°C.) | Time (min.) | Velocity (g. Pol./ g. Cat./ hr.) | Proportion of propylene polymerized (mol percent)[5] | Melt Index | | Flow ratio[3] | Density[4] |
| | | | | | | Normal[1] | Under 10× load[2] | | |
| 1 | 4.0 | 225 | 43 | 42.8 | 1.4 | 0.18 | 22.41 | 128 | 0.942 |
| 2 | 8.0 | 225 | 38 | 41.7 | 2.0 | 0.29 | 33.51 | 114 | 0.945 |
| 3 | 3.7 | 245 | 56 | 28.4 | 1.6 | 1.45 | 122 | 199 | 0.945 |
| 4 | 7.8 | 245 | 70 | 12.1 | 2.3 | 2.69 | | | 0.946 |

[1] Melt Index measured under 2.16 kg. of load in accordance with ASTM D-1238.
[2] Melt Index measured under 21.6 kg. of load in accordance with ASTM D-1238.
[3] Ratio of flow under 21.6 kg. of load per flow under 2.16 kg. of load.
[4] Density in accordance with ASTM D-1248.
[5] Proportion of the portion of propylene which was converted to a polymer against the portions of propylene and ethylene which were converted to the polymer.

As is apparent from the above Table 8, each of the obtained co-polymers shows a flow ratio exceeding 100 and hence when employed in blow molding, causes neither draw down nor melt fracture on the surface. They are therefore suitable for the manufacture of detergent bottles or the like.

For comparative purposes, a reaction product of γ-alumina and TiCl$_4$ having a Cl/Ti ratio of 2.2 is employed as the catalyst in a co-polymerization which is carried out by the same method as mentioned above. The co-polymer thus obtained has an extrusion property such that the flow ratio hardly reaches 50. Thus when it is employed for blow molding, melt fracture occurs on the surface of the extrudate and the bottle which is obtained does not have flat surfaces.

What we claim is:

1. A method of producing a polymerization catalyst having a Cl/Ti ratio of from 2.5 to 3.5, which method comprises the step of reacting at a temperature of from 50° C. to 600° C. a substantially amorphous alumina produced by calcining a substantially amorphous alumina hydrate at a temperature of from 300° C. to 700° C. with titanium tetrachloride, said substantially amorphous alumina having a specific surface area of not less than 100 m.$^2$/g. and a total pore volume less than 0.7 ml./g.

2. A method according to claim 1, in which the substantially amorphous alumina hydrate is prepared by hydrolyzing an aluminum alcoholate with an aqueous acidic solution of a pH-value less than 4 at a temperature up to 20° C.

3. A method according to claim 1, in which the substantially amorphous alumina hydrate is prepared by hydrolyzing an aluminum alcoholate with water at a temperature up to 50° C. in the presence of a hydrophobic solvent.

4. A method according to claim 1, in which the substantially amorphous alumina hydrate is prepared by hydrolyzing an aluminum alcoholate with an aqueous acidic solution at a temperature up to 50° C. in the presence of a hydrophobic solvent.

5. A method according to claim 2, in which the aluminum alcoholate is an aluminum alcoholate of a low aliphatic alcohol.

6. A method according to claim 2, in which the aluminum alcoholate is an aluminum isopropylate.

7. A method according to claim 2, in which hydrolysis of an aluminum alcoholate is carried out with an aqueous solution of an acid having a dissociation constant of $10^{-7}$ or more.

8. A method according to claim 2, in which hydrolysis of an aluminum alcoholate is carried out with an aqueous solution of hydrochloric acid.

9. A method according to claim 1, in which the substantially amorphous alumina hydrate is produced by passing an aqueous colloidal solution of basic aluminum sulfate through a water-immiscible inert organic liquid at a temperature of from 40° C. to 100° C. to render the said solution spherical hydrogels, rinsing said hydrogels in water before syneresis occurs to remove sulfate ions or aluminum sulphate, washing away gradually sulfate ions remaining in the said hydrogels, and drying the spherical hydrogels.

10. A method according to claim 1, in which the catalyst having a Cl/Ti atomic ratio of from 2.5 to 3.5 is produced by passing gaseous titanium tetrachloride diluted by an inert gas through a vertical type reactor filled with a substantially amorphous alumina having a particle size of 10 to 150 microns, a specific surface area not less than 100 m.$^2$/g. and a total pore volume less than 0.7 ml./g. upwardly from the bottom of the reactor at a temperature of from 300° C. to 600° C. and a velocity adequate to maintain the said particles in a fluidized state in the reactor.

11. A method according to claim 1, in which the catalyst having a Cl/Ti atomic ratio of from 2.5 to 3.5 is produced by passing gaseous titanium tetrachloride diluted by an inert gas through a vertical type reactor filled with a substantially amorphous alumina, which has a particle size of 10 to 150 microns, a specific surface area not less than 100 m.$^2$/g., and a total pore volume less than 0.7 ml./g. upwardly from the bottom of the reactor at a temperature of from 50° C. to 300° C. and a velocity adequate to maintain said particles in a fluidized state in the reactor, and subsequently passing only an inert gas through the said reactor upwardly from the bottom at a temperature of from 300° C. to 600° C. and a velocity adequate to maintain said particles in a fluidized state in the reactor.

12. Polymerization catalyst produced according to the method of claim 1.

13. A method of producing a polymerization catalyst having a Cl/Ti ratio from 2.5 to 3.5 which method comprises the steps of reacting at a temperature of from 50° C. to 600° C. a substantially amorphous alumina produced by calcining a substantially amorphous alumina hydrate at a temperature of from 300° C. to 700° C. with titanium tetrachloride to form a reaction product, said substantially amorphous alumina having a specific surface area of not less than 100 m.$^2$/g. and a total pore volume less than 0.7 ml./g.; and further reacting said reaction product with a chlorinating agent at a temperature of from 100° C. to 600° C.

14. A method according to claim 13, in which the catalyst having a Cl/Ti atomic ratio of from 2.5 to 3.5 is produced by passing gaseous titanium tetrachloride diluted by an inert gas through a vertical type reactor filled with a substantially amorphous alumina, which has a particle size of 10 to 150 microns, a specific surface area not less than 100 m.$^2$/g. and a total pore volume less than 0.7 ml./g. upwardly from the bottom of the reactor at a temperature of from 300° C. to 600° C. and a velocity adequate to maintain said particles in a fluidized state in the reactor, and allowing the thus obtained reaction product to come in contact with a chlorinating agent diluted by an inert gas at a temperature of from 100° C. and 600° C. and a velocity adequate to maintain said particles in a fluidized state in the reactor.

15. A method according to claim 13, in which the mixture consisting of ethylene and propylene is subjected to polymerization to obtain a polymer.

16. A method as claimed in claim 13, in which the mixture consisting of ethylene and butene-1 is subjected to polymerization.

17. A method of manufacturing polyolefin which comprises polymerizing an α-olefin selected from among ethylene and mixtures consisting of ethylene and α-olefins other than ethylene in an inert hydrocarbon solvent in the presence of a catalyst as claimed in claim 12, and a co-catalyst selected from among metals of the Groups I, II and III of the Periodic Table and hydrides and complex hydrides of said metals.

18. A method according to claim 17 in which the α-olefin is a mixture of ethylene and α-olefins other than ethylene and the ratio of the amount of ethylene present in the mixture to the total amount of the mixture to be polymerized is more than 95 mol percent.

19. A method according to claim 17, in which the catalyst is present in an amount of 0.1 g. to 100 g. per 1 liter of the solvent employed.

20. A method as claimed in claim 17, in which the co-catalyst is present in an amount of 0.01 to 10 parts per 1 part by weight of the catalyst.

21. A method according to claim 17, in which the polymerization of an α-olefin is carried out at a temperature up to 350° C. under a pressure of 10 kg./cm.$^2$ g. to 200 kg./cm.$^2$ g.

References Cited

UNITED STATES PATENTS

| | | |
|---|---|---|
| 3,166,542 | 1/1965 | Orzechowski et al. |
| 3,285,890 | 11/1966 | Aftandilian et al. |
| 3,216,982 | 11/1965 | Orzechowski et al. |
| 3,255,167 | 6/1966 | Thomas. |

FOREIGN PATENTS 823,024    11/1959    Great Britain.

JOSEPH L. SCHOFER, Primary Examiner

E. J. SMITH, Assistant Examiner

U.S. Cl. X.R.

252—441, 442; 260—94.9